(12) United States Patent
Panniello et al.

(10) Patent No.: US 10,473,797 B2
(45) Date of Patent: Nov. 12, 2019

(54) RADIATION DETECTION APPARATUS AND METHOD

(71) Applicant: JOHNSON MATTHEY PUBLIC LIMITED COMPANY, London (GB)

(72) Inventors: Marco Panniello, Naples (IT); Emanuele Ronchi, Cleveland (GB); Carl Robert Tipton, North Yorkshire (GB)

(73) Assignee: Johnson Matthey Public Limited Company, London, England (GB)

( * ) Notice: Subject to any disclaimer, the term of this patent is extended or adjusted under 35 U.S.C. 154(b) by 0 days.

(21) Appl. No.: 15/037,884

(22) PCT Filed: Dec. 18, 2014

(86) PCT No.: PCT/GB2014/053763
§ 371 (c)(1),
(2) Date: May 19, 2016

(87) PCT Pub. No.: WO2015/097448
PCT Pub. Date: Jul. 2, 2015

(65) Prior Publication Data
US 2016/0291171 A1    Oct. 6, 2016

(30) Foreign Application Priority Data
Dec. 23, 2013    (GB) .................................. 1322940.6

(51) Int. Cl.
*G01T 1/00*    (2006.01)
*G01T 1/20*    (2006.01)
(Continued)

(52) U.S. Cl.
CPC ............ *G01T 1/2018* (2013.01); *G01T 1/248* (2013.01); *G01V 5/005* (2013.01); *G01V 5/0016* (2013.01)

(58) Field of Classification Search
CPC ....... G01T 1/204; G01T 1/2045; G01T 1/202; G01T 1/178; G01T 1/2985
See application file for complete search history.

(56) References Cited

U.S. PATENT DOCUMENTS 9,632,187 B2 *   4/2017   Badawi ................. G01T 1/2985
2010/0010343 A1   1/2010   Daghighian et al.
(Continued)

FOREIGN PATENT DOCUMENTS

GB    2 451 678 A    2/2009
GB    2 496 736 A    5/2013
(Continued)

OTHER PUBLICATIONS

Charlton et al. "Report of the Consultant's Meeting on the Current Status and Future Trends on Radioisotope Application in Industry" International Atomic Agency, Vienna, Austria, Dec. 10-14, 2012, p. 1-178.*
(Continued)

*Primary Examiner* — Edwin C Gunberg
*Assistant Examiner* — Mamadou Faye
(74) *Attorney, Agent, or Firm* — BakerHostetler (57) ABSTRACT

An apparatus for detecting radiation for obtaining density information of a structure, the apparatus including: at least one detector (10), the detector (10) including: a scintillator (12) including a scintillating material for emitting light in response to incident radiation (14), and a photodetector (16) for receiving light emitted by the scintillating material (12) and outputting an electrical signal in response to light received from the scintillating material (12), wherein the photodetector (16) includes at least one silicon photomultiplier (16a). The invention reduces the volume of the apparatus and therefore provides particular advantages for use in scanning pipelines and other structures located deep subsea.

19 Claims, 9 Drawing Sheets

(51) Int. Cl.
*G01T 1/24* (2006.01)
*G01V 5/00* (2006.01)

(56) References Cited

U.S. PATENT DOCUMENTS

| | | | | |
|---|---|---|---|---|
| 2011/0240864 | A1* | 10/2011 | Degenhardt | G01T 1/00 250/362 |
| 2012/0025074 | A1 | 2/2012 | Barbi et al. | |
| 2013/0009267 | A1 | 1/2013 | Henseler et al. | |
| 2013/0193331 | A1* | 8/2013 | Perna | G01T 1/2002 250/366 |
| 2014/0091226 | A1* | 4/2014 | Duraj | G01J 1/08 250/366 |
| 2014/0145072 | A1* | 5/2014 | Adolph | G01T 1/40 250/261 |
| 2014/0367562 | A1* | 12/2014 | Vasilyev | G01V 5/08 250/269.1 |
| 2015/0090888 | A1* | 4/2015 | Yang | G01T 1/20 250/362 |
| 2015/0241572 | A1* | 8/2015 | Bowdon | G01N 23/046 378/64 |
| 2015/0373822 | A1* | 12/2015 | Churchman | G01N 23/04 378/59 |
| 2015/0380457 | A1* | 12/2015 | Fujii | G01T 1/241 378/19 |

FOREIGN PATENT DOCUMENTS

| | | |
|---|---|---|
| WO | 2007/023401 A1 | 3/2007 |
| WO | 2008/107808 A2 | 9/2008 |
| WO | 2008/121072 A1 | 10/2008 |
| WO | 2010/041191 A2 | 4/2010 |
| WO | 2013/064838 A1 | 5/2013 |
| WO | 2014/173644 A1 | 10/2014 |

OTHER PUBLICATIONS

Shih, Y.C., et al., "An 8×8 row-column summing readout electronics for preclinical positron emission tomography scanners", 2009 IEEE Nuclear Science Symposium Confernce Record, Orlando, FL, USA, IEEE, Piscataway, NJ, USA, Oct. 24, 2009 (Oct. 24, 2009), pp. 2376-2380, XP031621584.

Kedar, Debbie, et al., "Subsea ultraviolet solar-blind broadband free-space optics communication", SPIE, PO Box 10 Bellingham WA 98227-0010 USA, Optical Engineering, vol. 48, No. 4, Apr. 1, 2009 (Apr. 1, 2009)-Apr. 30, 2009 (Apr. 30, 2009), pp. 046001-1-046001-7, XP040506551, DOI: 10.1117/1.3120482.

"B-Series: Fast, Blue-Sensitive Silicon Photomultiplier Sensors: Data Sheet", SENSL, Rev 3.1, Nov. 2015, retrieved at http://www.sensl.com/downloads/ds/DS-MicroBseries.pdf.

Downie, Evan, et al., "Investigation of analog charge multiplexing schemes for SiPM based PET block detectors", Physics in Medicine and Biology, vol. 58, 2013, pp. 3943-3964, DOI: 10.1088/0031-9155/58/11/3943.

Yamamoto, Seiichi, et al., "A temperature-dependent gain control system for improving the stability of Si-PM-based PET systems", Physics in Medicine and Biology, vol. 56, 2011, pp. 2873-2882, DOI: 10.1088/0031-9155/56/9/015.

Song, Tae Yong, et al., "A sub-millimeter resolution PET detector module using a multi-pixel photon country array", Physics in Medicine and Biology, vol. 55, 2010, pp. 2573-2587, DOI 10.1088/0031-9155/55/9/010.

Dey, Samrat, et al., "A CMOS ASIC Design for SiPM Arrays", 2011 IEEE Nuclear Science Symposium Conference Record, published 2012, pp. 732-737, DOI: 10.1109/NSSMIC.2011.6154092.

International Search Report, dated Apr. 1, 2015, from corresponding PCT Application.

United Kingdom Search Report, dated May 7, 2014, from corresponding GB Application.

United Kingdom Search Report, dated Mar. 21, 2015, from corresponding GB Application.

* cited by examiner

RADIATION DETECTION APPARATUS AND METHOD

The present invention relates to an apparatus and method for detecting radiation, and relates particularly, but not exclusively, to an apparatus and method for scanning a structure to detect changes in density between different parts of the structure. The apparatus and method of the invention have particular benefits for use in an undersea pipeline inspection apparatus.

It is known to use gamma radiation for scanning structures, for example to obtain information about the density within the structure or to identify flaws such as cracks or corrosion in a structure. This is particularly useful for inspecting pipes subsea, where it is not always possible to inspect the pipe from the interior. Gamma scanning is also used for obtaining information about other industrial structures such as distillation columns and the like.

An apparatus for scanning structures such as a pipeline or process vessel using gamma radiation is described in GB 2496736 A. This apparatus comprises a source of gamma radiation and an array of detectors. The apparatus is capable of being arranged with the structure to be scanned, such as a pipeline, positioned between the source and detectors so that radiation emitted by the source can pass along a plurality of paths through a portion of the structure to the detectors. The number of detectors in the array may range from fewer than 10 up to more than 100, e.g. up to 150, depending on the application. To obtain high resolution data, a large number of detectors are used, closely spaced from one another. The detectors are arranged in the form of an arc centred on the structure to be scanned. In operation, the source and array of detectors are arranged in fixed relationship with respect to each other, and are rotated around the structure to be scanned. In this way, information about the density of the structure along a plurality of paths is obtained, enabling a high resolution density map of the structure to be calculated. This technique has similarities with medical imaging techniques such as x-ray tomography.

When deploying this gamma scanning techniques in a subsea environment, there are additional challenges which do not arise with land-based measurements. When operating subsea at a depth of 1000 meters the pressure is 100 atmospheres. For each additional 1000 meters of depth below sea level, the pressure increases by a further 100 atmospheres. The apparatus must be able to withstand this pressure. Furthermore the apparatus must be compact for deployment subsea using remotely operated vehicles (ROVs) capable of operating at the required depth. It is challenging to package all the required components of the apparatus into a sufficiently small volume. In order to deploy this technique at even greater depths, it is necessary to meet ever more stringent requirements, particularly regarding the size of the apparatus. Integrating a large number of radiation detectors into an apparatus for use subsea is one of the main challenges of designing such an apparatus.

Preferred embodiments of the present invention seek to overcome one or more of the above disadvantages of the prior art.

According to a first aspect of the present invention, there is provided an apparatus for detecting radiation for obtaining information about the density of a structure, the apparatus comprising:
at least one detector, the detector comprising:
a scintillator comprising a scintillating material for emitting light in response to incident radiation, and
a photodetector for receiving light emitted by the scintillating material and outputting an electrical signal in response to light received from the scintillating material,
wherein the photodetector comprises at least one silicon photomultiplier.

By providing a photodetector comprising at least one silicon photomultiplier, the present invention provides an advantageously compact apparatus. In the prior art, conventional photomultiplier tubes are used as a photodetector and are preferred due to their high sensitivity to low light levels. However, photomultiplier tubes are based on vacuum tubes which are relatively bulky, must be protected against very high pressures if used subsea, and require a high voltage power supply (~1 kV) which must be isolated for subsea operation. In contrast, silicon photomultipliers are compact, robust, and operate at low voltages. By providing a photodetector comprising at least one silicon photomultiplier, the present invention therefore reduces the space occupied by the photodetector, requires less protection against high pressures, and it is no longer necessary to insulate high voltage power supply connections from other components or seawater. All these factors lead to a reduction in overall volume of the apparatus. In addition, the compact size of the detectors allows the detectors to be packed more closely to improve the scanning resolution of the apparatus and/or for more sophisticated data processing to be carried out adjacent each detector. Yet another advantage of the present invention is that silicon photomultipliers, although exhibiting high noise at room temperature, exhibit low noise at temperatures of around 4° C. which are typical at depths of the order of a kilometer subsea, which means that the present invention is particularly adapted for use subsea. Nonetheless, the small size of silicon photomultipliers means that it is relatively easy to provide temperature stabilisation if required.

The photodetector may comprise a plurality of silicon photomultipliers.

This feature provides several advantages. Most importantly by using a plurality of silicon photomultipliers to detect light emitted by the scintillating material, the signal to noise ratio is improved, improving output signal resolution. This improvement appears to be due partly to the fact that a larger area of the scintillating material can be covered, thereby detect more scintillation events. However, this is not obvious, since in the prior art a single conventional photomultiplier tube is used to detect light from a relatively small area of the scintillating material. The surfaces of the scintillating material which are not optically coupled to the photodetector are often coated with a reflecting surface so that more of the scintillation photons reach the photodetector. It would therefore be expected that one silicon photomultiplier covering a similar area to the conventional photomultiplier tube would be sufficient. Moreover, the improvement does not simply scale with the area covered, and once optimum performance is reached there appears to be no further improvement in further increasing the area of the scintillating material covered silicon photomultipliers. There are also several advantages in using a plurality of silicon photomultipliers rather than a single silicon photomultiplier covering the same area. As the area of a silicon photomultiplier increases, it becomes more difficult to ensure the quality of the sensor and consistency between sensors. The response time of the sensor also increases with size. Therefore using a plurality of silicon photomultiplier sensors ensures better performance and higher speed compared to using one large silicon photomultiplier, and also provides redundancy in the event of failure of one of the silicon photomultipliers.

The plurality of silicon photomultipliers may be arranged in contact with one or more surfaces of the scintillating material.

Advantageously the thin wafer configuration of silicon photomultipliers means that they can be positioned directly against the flat surfaces of a scintillating crystal to obtain good optical coupling. By arranging the silicon photomultipliers against a single surface of the scintillating material, a particularly compact arrangement is obtained. Alternatively the silicon photomultipliers may be arranged in contact with more than one surface of the scintillating material in order to detect scintillating photons emitted in different directions.

The plurality of silicon photomultipliers may be tiled along at least one surface of the scintillating material.

Advantageously silicon photomultipliers may be provided in a suitable shape to effectively cover an entire surface of the scintillating material, for example square or rectangular silicon photomultipliers may be used to cover a rectangular surface of a scintillating crystal. By tiling the silicon photomultipliers side by side with no space, the area of the detecting surface is optimised.

The output signals of said plurality of silicon photomultipliers may be combined prior to amplification.

Surprisingly, it has been found that it is possible to combine the output signals of a plurality of silicon photomultipliers prior to amplifying the signal for further processing. This enables the detector to be simplified as only one amplification stage is needed. This again reduces the space occupied by electronics in the apparatus.

The apparatus may further comprise a power supply arranged to supply power to said plurality of silicon photomultipliers.

It is necessary to apply a biasing voltage to each silicon photomultiplier and it is possible to tune the gain of the silicon photomultiplier by adjusting the biasing voltage, in a similar manner to that known for conventional photomultiplier tubes. The inventors have found that it is possible to power a plurality of silicon photomultipliers using a single power supply, which provides a further significant reduction in hardware required for the apparatus, thereby reducing the overall size of the apparatus. This was an unexpected result since one would expect the biasing voltage to be pinned to that of the silicon photomultiplier having the lowest breakdown voltage, such that only one of the silicon photomultipliers would be operational.

The apparatus may further comprise at least one multichannel analyser for measuring a number of radiation particles from said source detected by at least one said detector, said multichannel analyser comprising a field programmable gate array (FPGA).

A multichannel analyser (MCA) enables energy spectra to be generated rapidly from the output of silicon photomultipliers since the output electrical signals are counted simultaneously for all channels. These are traditionally bench top devices. However, a multichannel analyser comprising an FPGA has been developed, which is very compact and operates on a low voltage. It is therefore possible to provide a multichannel analyser for each detector and to integrate these into a compact apparatus. The combination of photodetector and multichannel analyser is a low power unit which may be battery powered. A further advantage is that rapid energy analysis of the detected radiation enables changes in the gain of the photodetector to be monitored in real time, for example by observing the position of a photopeak corresponding to a characteristic energy of the radiation source. Temperature drifts can thereby be tracked and/or compensated by adjustment of the bias voltage applied to the photodetector to keep the photopeak within a suitable range of channels of the MCA.

Said or each multichannel analyser may be located adjacent to a respective said photodetector.

It is particularly advantageous to locate the multichannel analyser adjacent to the photodetector, as this avoids transmitting the output signals of the photodetector to a central location for further processing, thereby reducing electrical noise on the signal. Having the bulk of the analysis conducted in situ by the MCA means that further volume is saved. Importantly, the FPGA outputs a digital signal, which can be transmitted for further processing, or to a nearby ship, with less susceptibility to noise and therefore less shielding.

The apparatus may further comprise temperature stabilisation means for stabilising the temperature of the/or each silicon photomultiplier.

This feature enables the apparatus to be used at a range of operating temperatures. It may not be necessary to include temperature stabilisation for operating the apparatus subsea where temperatures are around 4° C., but it may improve the performance of the apparatus when used at higher temperatures, for example for land-based measurements.

Said radiation may be gamma radiation.

Said apparatus may further comprise a source of radiation.

The apparatus may comprise a plurality of said detectors.

This feature enables the apparatus to detect radiation having travelled along a plurality of different paths through a structure to be scanned, from a source to the detector. The present invention provides a particularly compact arrangement when a plurality of detectors is used.

The apparatus may further comprise a power supply arranged to supply power to said plurality of detectors.

As discussed above, it has been found that it is possible to apply a biasing voltage to multiple silicon photomultipliers in parallel using a single power supply. A further space saving may therefore be achieved by supplying the photomultipliers of a plurality of different photodetectors using a single power supply. Reducing the number of power supplies also reduces the electrical isolation requirements.

Said plurality of detectors may be arranged in an arc around a space adapted to receive a structure to be scanned.

The advantage of this feature is that is provides a particularly compact arrangement for scanning a structure such as a pipe.

The plurality of detectors and said source may be arranged on opposite sides of space for receiving a structure to be scanned, and the apparatus may further comprise means for rotating said plurality of detectors and said source around a structure to be scanned.

By rotating the source and detectors around a structure to be scanned, information about the density of the structure along a plurality of intersecting paths is obtained, enabling detailed information about the density of the structure to be calculated.

The apparatus may be a subsea apparatus. For example, the apparatus may be a subsea apparatus suitable for use at a depth of 1000 m. The apparatus may be a subsea apparatus suitable for use at a depth greater than 1000 m.

According to a second aspect of the invention, there is provided a method for scanning a structure to detect differences in density between different parts of the structure, the method comprising:

providing one or more detectors, said or each detector comprising:
  a scintillator comprising a scintillating material for emitting light in response to incident radiation, and
  a photodetector for receiving light emitted by the scintillating material and outputting an electrical signal in response to light received from the scintillating material,
  wherein the photodetector comprises at least one silicon photomultiplier;
providing a source of radiation arranged to emit radiation towards said or each detector through the structure to be scanned; and
measuring a number of radiation particles from said source detected by said or each detector.

At least one said photodetector may comprise a plurality of silicon photomultipliers.

The plurality of silicon photomultipliers may be arranged in contact with one or more surfaces of the scintillating material.

The plurality of silicon photomultipliers may be tiled along at least one surface of the respective scintillating material.

The output signals of said plurality of silicon photomultipliers may be combined prior to amplification.

The method may further comprise providing a power supply arranged to supply power to said plurality of silicon photomultipliers.

The method may further comprise providing at least one multichannel analyser for measuring a number of radiation particles from said source detected by at least one respective detector, said multichannel analyser comprising a field programmable gate array (FPGA).

Said or each multichannel analyser may be located adjacent to a respective said photodetector.

The method may further comprise stabilising the temperature of the or each silicon photomultiplier.

Said radiation may be gamma radiation.

The method may further comprise providing a power supply arranged to supply power to said plurality of said detectors.

A plurality of said detectors may be arranged in an arc around a space adapted to receive a structure to be scanned.

A plurality of said detectors and said source may be arranged on opposite sides of a space for receiving a structure to be scanned, and said method may further comprise rotating said plurality of detectors and said source around a structure to be scanned.

The method may further comprise the step of positioning the apparatus at a subsea measurement location, prior to carrying out above steps at said location. For example, the subsea measurement location may be at a depth of up to 1000 m. The subsea measurement location may be at a depth of 1000 m or greater.

A preferred embodiment of the present invention will now be described, by way of example, and not in any limitative sense, with reference to the accompanying drawings, in which:

(FIG. 6A), 21° C. (FIG. 6B) and 40° C. (FIG. 6C);

(FIGS. 7A and 7B) and using test silicon photomultiplier arrays comprising 7 and 2 silicon photomultipliers respectively at 17-18° C. (FIGS. 7C and 7D)

Figure 1:
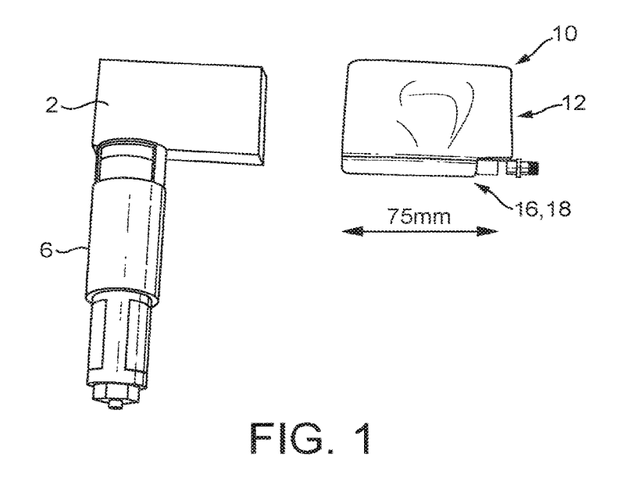
FIG. 1 shows (left image) an example of a detector arrangement incorporating a photomultiplier tube for comparison with the present invention, and (right image) a detector according to an embodiment of the present invention.
Figure 2:
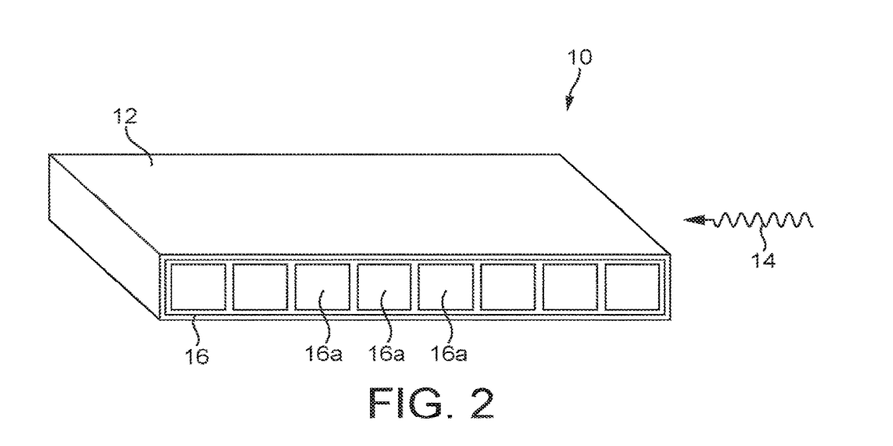
FIG. 2 shows a detector for an apparatus according to an embodiment of the present invention.
Figure 3:
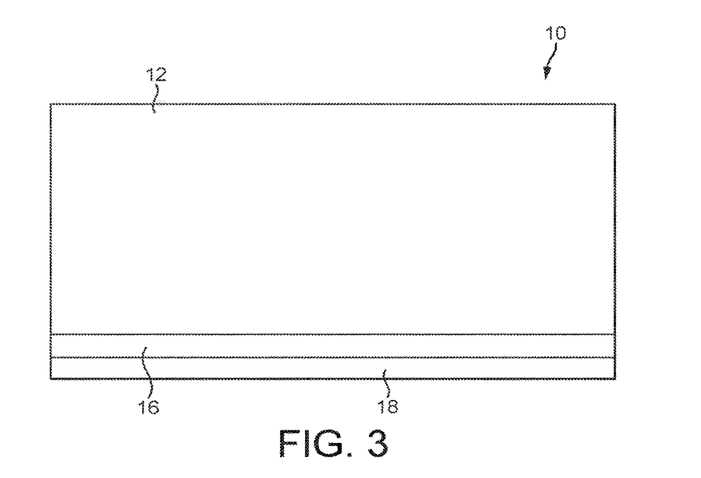
FIG. 3 shows a detector and multichannel analyser circuitry for an apparatus according to a further embodiment of the present invention.

With reference to FIGS. 1 (right image), 2 and 3, an apparatus according to an embodiment of the present invention comprises a radiation detector 10 comprising a scintillator, in the form of scintillating crystal 12, for emitting light in response to incident radiation 14 and a photodetector 16, in the form of an array of silicon photomultipliers 16a, for receiving light emitted by the scintillating crystal 12 and outputting an electrical signal in response to light received from the scintillating material 12. The array of silicon photomultipliers are arranged such that their detection surfaces receive scintillation photons emitted through a surface of the scintillating crystal 12. Preferably, the silicon photomultipliers 16a are in contact with the crystal 12. The electrical signal output by the photodetector 16 is transmitted to a detection circuit board 18 comprising a multichannel analyser for counting a number of radiation particles, in this case gamma photons, detected by the detector 10.

In this embodiment, the radiation source is a gamma radiation source, such as $^{137}$Cs which has a characteristic emission at 661.7 keV and sufficient penetrating power for scanning dense structures such as subsea pipelines. A scintillating material suitable for detecting gamma photons at this energy is BGO (bismuth germanate). However other sources and scintillating materials may be used as is known in the art. Although the present embodiment is based on gamma photon detection, it will be appreciated that the present invention can be applied to other types of radiation (e.g. neutrons).

In this embodiment, the photodetector 16 comprises an array of eight silicon photomultiplier sensors 16a arranged in parallel. An example of a suitable silicon photomultiplier 16a is the 6×6 mm 35 µm B series available from SensL. The sensors are less than 1 mm thick.

Silicon photomultipliers are based on avalanche diode arrays with integral clamping resistors. They operate with relatively low bias voltages, typically around 30V, and produce an output current which is proportional to the number of incident photons. When combined with normal scintillating materials they can detect a wide range of radiations. Conventional photomultiplier tubes are currently the industry standard for gamma ray scanning because they are particularly sensitive to low light levels. One of the main advantages of silicon photomultipliers over conventional photomultiplier tubes is their compact size. This is illustrated by FIG. 1 which shows two detectors side by side: the left hand detector is an example of a detector comprising a scintillating crystal 2 and a photodetector 6 in the form of a photomultiplier tube, as is used in an apparatus for scanning subsea pipelines; the right hand detector 10 is a detector according to an embodiment of the present invention, comprising a scintillating crystal 2, a photodetector 6 in the form of an array of silicon photomultipliers tube, and additionally comprising detection electronics 18. As can be seen, the detector 10 of the present invention has a size determined mainly by the size of the scintillating crystal 10. Other advantages of silicon photomultipliers are that they are unaffected by magnetic and electric fields and are mechanically more robust.

Only one detector 10 is shown in each of FIGS. 1, 2 and 3. However, for scanning a pipeline or similar structure, a large number of detectors 10 is preferred for obtaining high resolution data with a reasonable scanning time. In one embodiment of the apparatus, ninety-five detectors 10 are arranged closely spaced along an arc of a circle on one side of the structure to be scanned, with the radiation source position on the other. The apparatus includes means for positioning the source and detectors 10 in close proximity to the structure to be scanned and for rotating the source and detectors 10 around the structure, without changing their relative positions. It is challenging to integrate such a large number of detectors 10 into such an apparatus, particularly if the apparatus is to be deployed subsea. In subsea applications, the apparatus must be sealed against high pressure and must therefore fit into a particularly compact volume. By using silicon photomultipliers rather than conventional photomultiplier tubes, sufficient space is saved that it is possible to fit detection electronics 18 alongside each detector 10. In this embodiment, the detection electronics 18 has been adapted to take advantage of the compact arrangement of the detector 10 and to produce yet further space savings.

Figure 5:
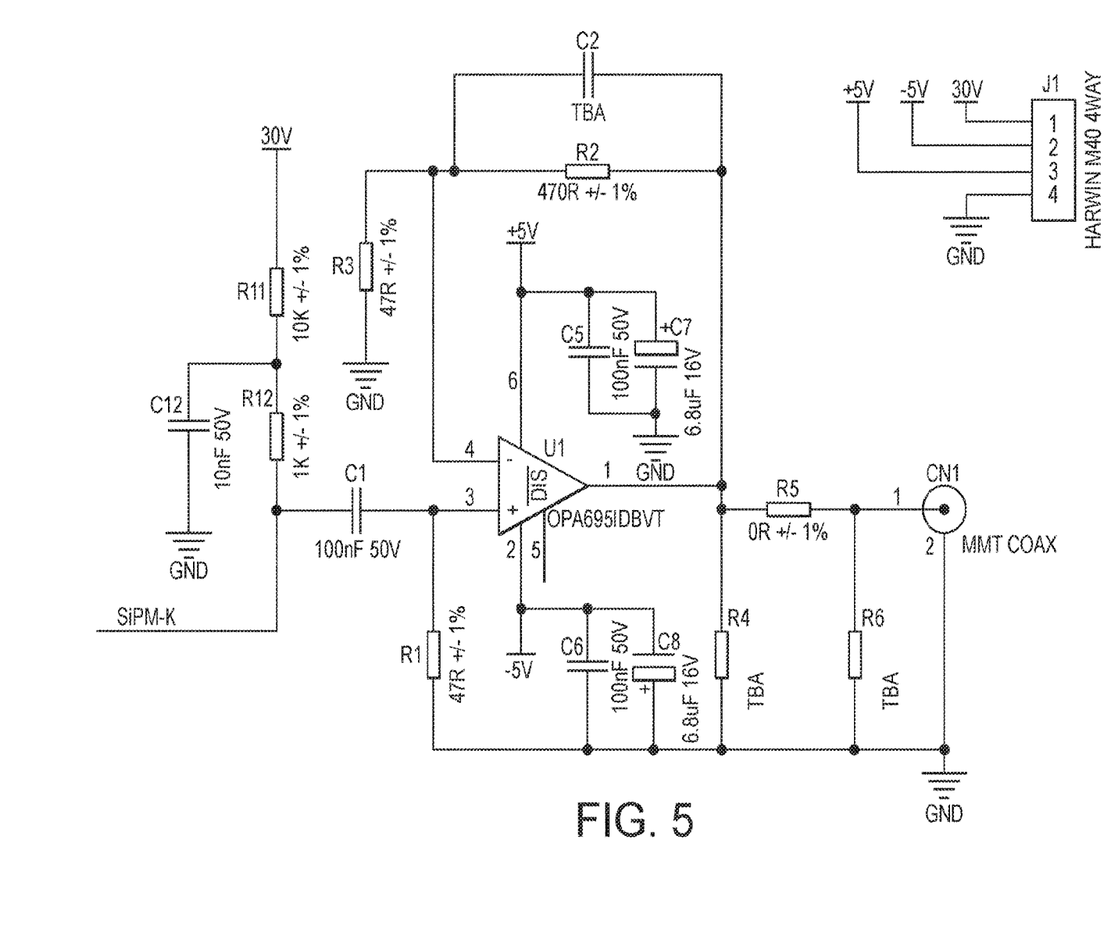
FIG. 5 is a schematic representation of an amplifier circuit for one or more silicon photomultipliers for an apparatus according to an embodiment of the present invention.

Silicon photomultipliers produce a current output dependent on the number of incident photons. In order to produce count rates or spectra, the signal is generally converted to a voltage and amplified with a high speed amplifier. It has been found that it is possible to combine the output signals of the plurality of silicon photomultipliers in parallel prior to amplification, rather than summing together the outputs after amplifying each using an analogue amplifier as recommended by manufacturers of these devices. This provides a much simpler arrangement, occupying less space. FIG. 5 shows an amplifier for the photodetector 16. The amplifier receives the photocurrent from the parallel array of silicon photomultipliers and uses an 11 kΩ series resistance to convert the photocurrent to a voltage. Typical photocurrents of 180-200 nA generate a signal of around 2 mV across the readout resistors which is then amplified by a factor of 10 by the amplifier. A 100 nF coupling capacitor couples the voltage signal to the amplification electronics. The signal pulses have a width of around 2 μs and are amplified using a high bandwidth op amp. Given the relatively low signal level, it is important that a first stage of amplification is provided close to the photodetector 16.

The reverse bias voltage is applied to the silicon photomultipliers through this readout resistance. It has been found that it is possible to use a single power supply to apply the biasing voltage (around 30V) required by each of the silicon photomultipliers by connecting them in parallel to the power supply. A capacitor may also be connected in parallel to the power supply to stabilise the bias voltage. Applied biasing voltages in the range from 25.75V to 31V have been used. However, more than 2V can be dropped across the readout resistors, such that the maximum reverse diode bias voltage applied to the silicon photomultipliers has been 28.98V. A suitable variable bias generator is provided by a boost converter such as the LT3494 available from Linear Technology.

The detector 10 is sensitive not only to the number of gamma photons detected, but also to their energies. The amplitude of the electrical pulses output by the photodetector 16 depends on the energy of the photons received from the scintillating crystal 12. Since the amount of light produced by the scintillating crystal 12 is proportional to the amount of gamma ray energy absorbed in the scintillating crystal 12, it follows that the amplitude of the electrical pulses output by the photodetector 16 depends on the gamma ray energy absorbed by the scintillating crystal 12. The data processing electronics 18 comprises a multichannel analyser for discriminating between pulses of different amplitude, assigning pulses having an amplitude within a specified range to a corresponding channel of the MCA, and counting the number of electrical pulses assigned to each channel.

The multichannel analyser used in this embodiment comprises a high frequency analogue to digital convertor (ADC) followed by a field programmable gate array (FPGA). Multichannel analysers are traditionally bench top devices, and therefore not suitable for use in an apparatus such as this. However, by developing an MCA based on a FPGA, the detection electronics 18 is sufficiently compact to be located alongside each scintillating crystal 12, as shown in FIG. 3. In this embodiment, the FPGA has been programmed to generate a 256 channel spectrum. The combination of using an array of silicon photomultiplier sensors 16a tiled on a surface of a scintillating crystal 12, coupled with the electronics 18 used in the FPGA-based MCA, results in a very compact, totally integrated detector 10, with a footprint that is essentially determined by the size of the scintillating crystal 12. In a subsea environment, this is very advantageous as the overall volume of the apparatus is reduced, meaning that the apparatus can be more easily sealed for high pressure. Moreover, most of the data processing may be conducted on board via the MCA, meaning that less electrical noise is introduced when transferring data from the detection electronics 18 to a CPU for analysis. Advantageously, the output of the MCA is a digital signal which is much less susceptible to noise than an analogue signal, such as the signals output by the silicon photomultipliers 16a.

Figure 4A:
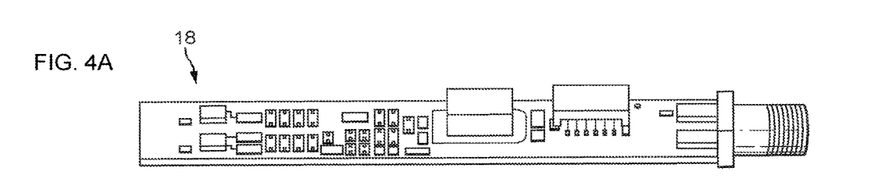
FIGS. 4A and 4B show front and rear surfaces respectively of an arrangement of a silicon photomultiplier array and multichannel analyser circuitry for an apparatus according to an embodiment of the present invention.
Figure 4B:
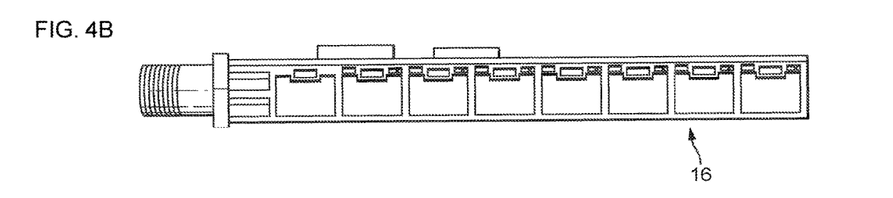

FIG. 4 shows the front and rear surfaces of an arrangement of the photodetector 16 and detection electronics board 18. The upper image shows the surface of a board carrying the detection electronics 18 and the lower image shows the surface of a board carrying the silicon photomultiplier sensors 16a. In use, this surface is positioned against a surface of the scintillating crystal 12 as shown in FIG. 3.

FIG. 6 shows example energy spectra of scintillation events detected by a photodetector 16 comprising 7 operational photomultiplier sensors 16a arranged in parallel. On each graph, the vertical axis shows the number of counts (i.e. the number of electrical pulses output by the photodetector 16), and the horizontal axis shows the MCA channel to which the pulses were assigned. Each channel corresponds to an amplitude range of the detected electrical pulses. In these examples, only 64 channels were used to collect each spectrum.

Figure 6A:
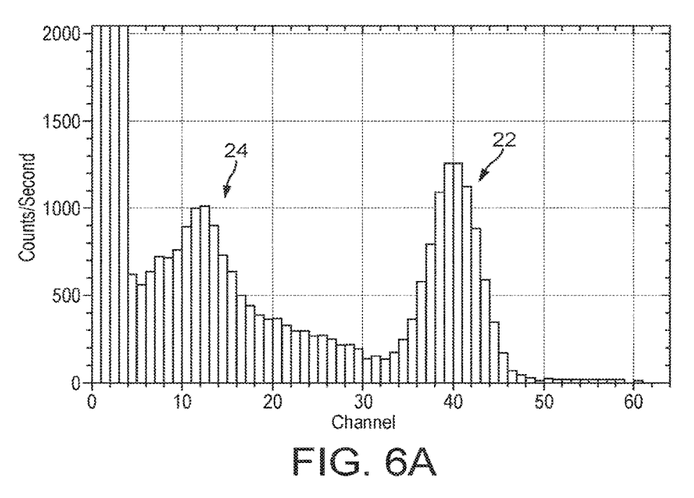
FIG. 6 shows spectra obtained using a test silicon photomultiplier array at temperatures of 4° C.

The gamma ray source used for obtaining the spectra shown in FIG. 6 is $^{137}$Cs which has a characteristic emission at 661.7 keV. However, the energy spectra do not show a single narrow peak because of the way the gamma photons interact with the scintillating crystal 12. The conversion to visible photons made by the scintillating material 12 depends on whether the gamma photons are completely absorbed or randomly scattered. The peak 22 towards the right of the spectrum (around channel number 40 in FIG. 6A) is called the photopeak and is due to interaction processes such as the photoelectric effect in which the full energy of the gamma photon is deposited in the scintillating material 12. The photopeak 22 appears as a Gaussian due to intrinsic energy broadening within the detector itself. The mean and standard deviation of the Gaussian photopeak 22 give information concerning the energy of the gamma photons and the detector resolution respectively. The signal 24 to the left of the photopeak 22 is due to interaction processes such as Compton scattering which deposit only a part of the energy of gamma photon in the scintillating material 12 and lead to a smooth distribution at energies lower than the photopeak 22. Background radiation also contributes to the spectrum at low energies.

For this application, the only useful information comes from the photopeak 22. Changes in the height of the photopeak 22 give information about changes in the density of the structure through which the radiation has travelled. The position of the photopeak 22 with respect to channel number depends on the gamma photon energy and photodetector gain. The photodetector gain varies with temperature and applied bias voltage, and further depends on the intrinsic properties of each photomultiplier sensor 16a. An advantage of using silicon photomultiplier sensors 16a is that the manufacturing process is highly reproducible. This means that it is possible to select a group of silicon photomultipliers 16a which, given the same boundary conditions (applied voltage, temperature etc), have a similar gain and therefore output signals for the photopeak centred on the same or very similar channel number. For example, silicon photomultipliers manufactured on the same wafer are likely to have very similar properties. When a plurality of selected silicon photomultipliers 16a having similar gain are grouped together in a single photodetector 16, it is therefore possible to apply a common bias voltage to all the silicon photomultipliers 16a in the photodetector 16 and to combine their outputs to produce a spectrum using a single multichannel analyser.

FIG. 6A shows a spectrum obtained at 5.1° C. which is similar to subsea temperatures which are typically around 4° C., and with an applied bias voltage of 26.5V. At around 5° C. a reliable spectrum is produced with very high count rates compared to conventional photomultiplier tubes, around 900-1300 counts per channel. At this temperature, the photopeak is well resolved, which is important for accurately determining the number of counts contributing to the photopeak. The resolution of the detector 10 is around 17% at 4° C., which is better than that obtained using conventional photomultiplier tubes, which is typically around 21-30%.

Figure 6B:
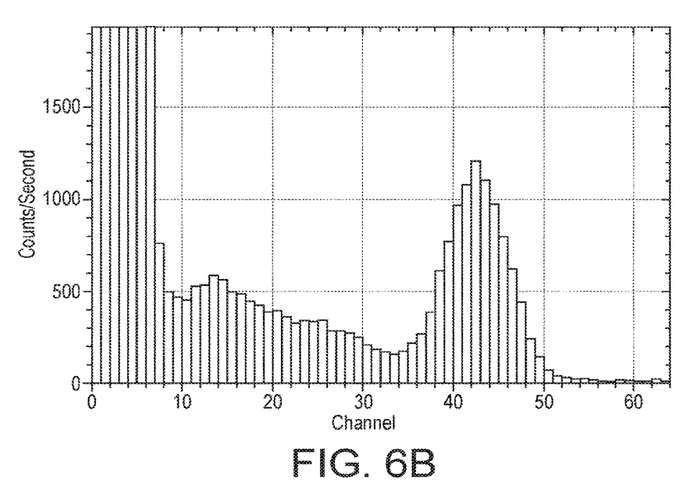
Figure 6C:
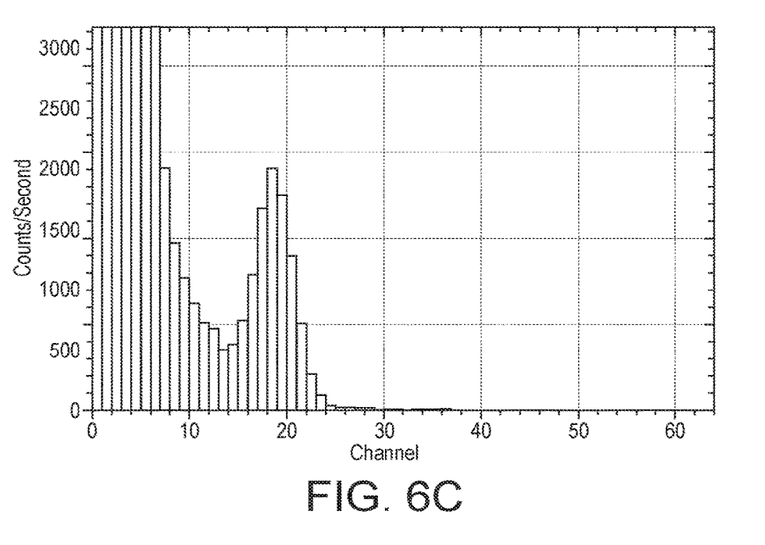
Figure 7A:
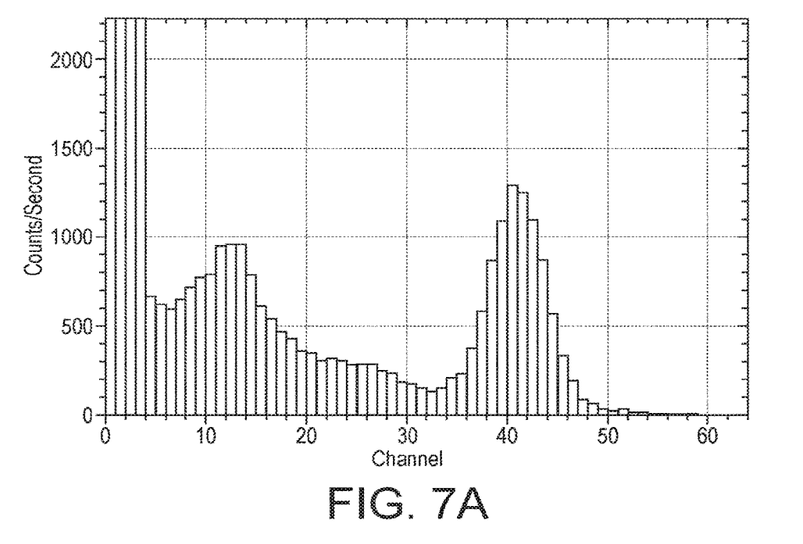
FIG. 7 shows spectra obtained using test silicon photomultiplier arrays comprising 7 and 4 silicon photomultipliers respectively at 4-5° C.
Figure 7B:
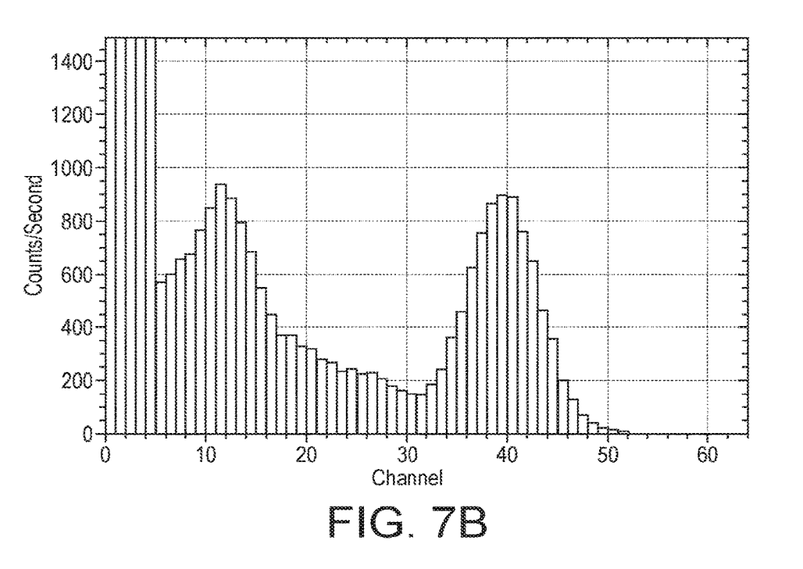
Figure 7C:
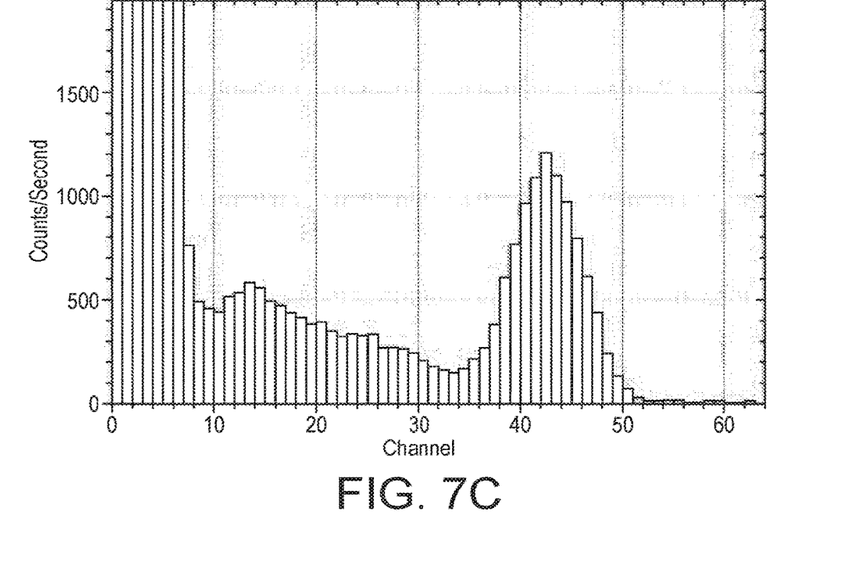
Figure 7D:
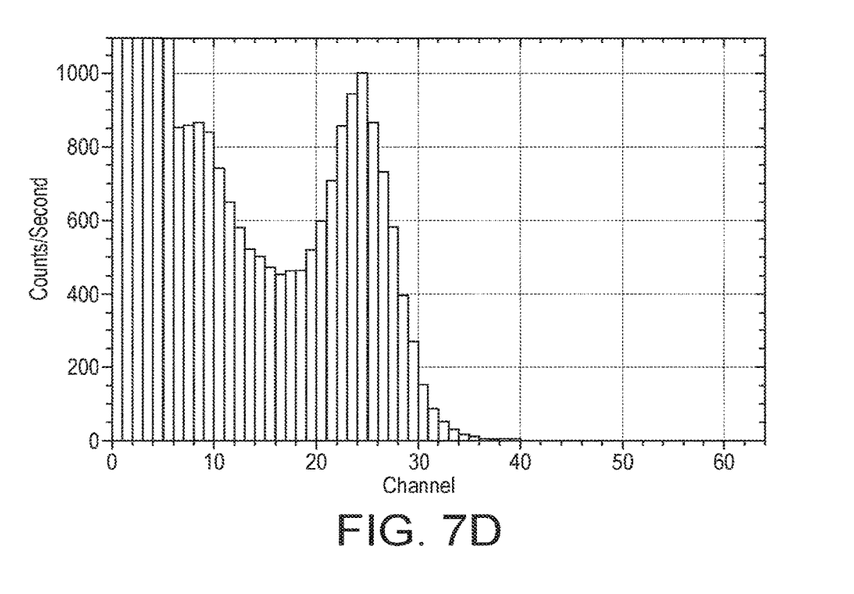

The detector resolution deteriorates with increasing temperature, on the order of around 0.25% $K^{-1}$. FIGS. 6B and 6C show spectra obtained at 17.0° C. and 40.4° C. respectively (with applied bias voltages of 28.1V and 26.5V respectively). At 17° C. (FIG. 6B) the photopeak 22 is still reasonably well resolved, although it begins to overlap the Compton scattering. At 40° C. (FIG. 6C) the photopeak 22 is not resolved from the Compton scattering. Temperature control and stabilisation may therefore be unnecessary when the apparatus is used subsea, but may be necessary to provide a good signal at higher temperatures.

In use, temperature drifts cause the photodetector output signals corresponding to the photopeak to drift to higher or lower amplitudes, such that the photopeak position changes with respect to the channels of the MCA. By providing an on-board MCA for each detector, the photopeak position can be used to monitor temperature drifts and to provide real time feedback for adjusting the bias voltage to compensate for these. In this way, the photopeak position can be maintained within a small range of channels of the MCA.

FIG. 7 shows spectra obtained using photodetectors 16 comprising different numbers of silicon photomultiplier sensors 16a. FIGS. 7A and 7B compare spectra obtained using 7 sensors and 4 sensors respectively, at similar temperatures (5.1° C. and 6.1° C. respectively) and with identical bias voltage (27.5 V). The position of the photopeak 22 hardly changed, but the count rate dropped by around 30% and there was some broadening of the photopeak 22 when only four sensors were used. FIGS. 7C and 7D compare spectra obtained using 7 sensors (FIG. 8C) and 2 sensors (FIG. 7D) at similar temperatures (17.0° C. and 17.6° C. respectively) and with similar biasing voltages (28.0 V and 27.0 V respectively). Using only 2 sensors 16a, the position of the photopeak 22 dropped significantly and the count rate dropped by around 20%. These results are interpreted as showing that, while all the silicon photomultiplier sensors 16A of the photodetector 16 contribute to the counts recorded, a single gamma event does not necessarily result in an output pulse from each sensor 16a due to the position of the gamma interaction within the scintillating crystal 12. The count rate drops when a lower number of sensors is used because events in some parts of the scintillating crystal 12 are not recorded, or some photons generated by a single gamma event are missed as they span more than the area of the sensors. The resolution of the photodetector 16 also depends on the number of sensors used. There was very little difference in resolution between 7 and 8 sensors and the signal amplitude remained roughly constant. However, dropping to six sensors had a noticeable effect on the photopeak position and count rate.

Five different photodetector 16 and electronics 18 packages were tested, each photodetector including 8 operational silicon photomultipliers 16a. Consistency between each package was found to be very good, with the main variation being due to the quality of the optical coupling between the photodetector 16 and scintillating crystal 12. Disassembly and reassembly of the photodetector 16 and scintillating crystal 12 lead to a 5-10% variation in the position of the photopeak. The consistency between the photodetectors means that it is possible to assemble photodetectors having sufficiently similar properties that a single power supply can be used to apply a common bias voltage to more than one photodetector. This saves further space in the apparatus.

Figure 8A:
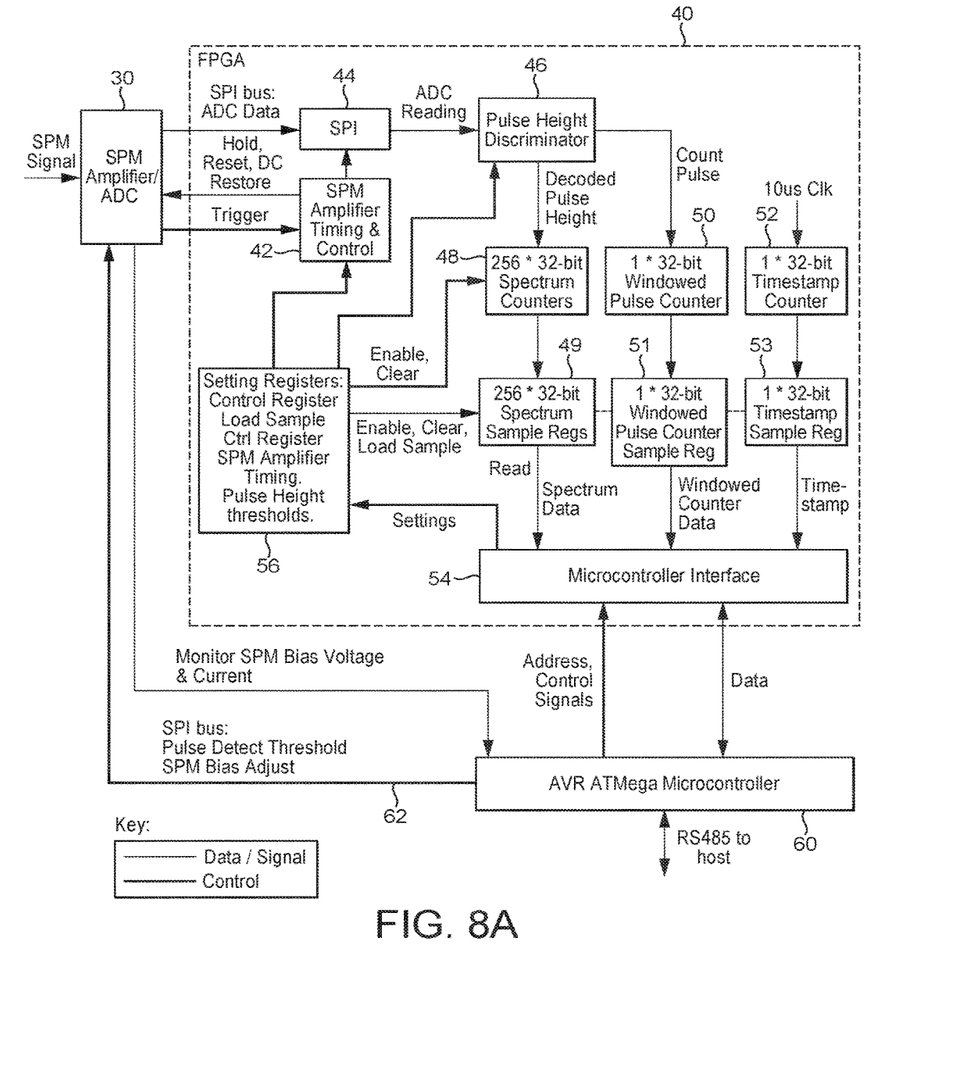
FIGS. 8A and 8B show a schematic representation of detection electronics for an apparatus according to an embodiment of the present invention.
Figure 8B:
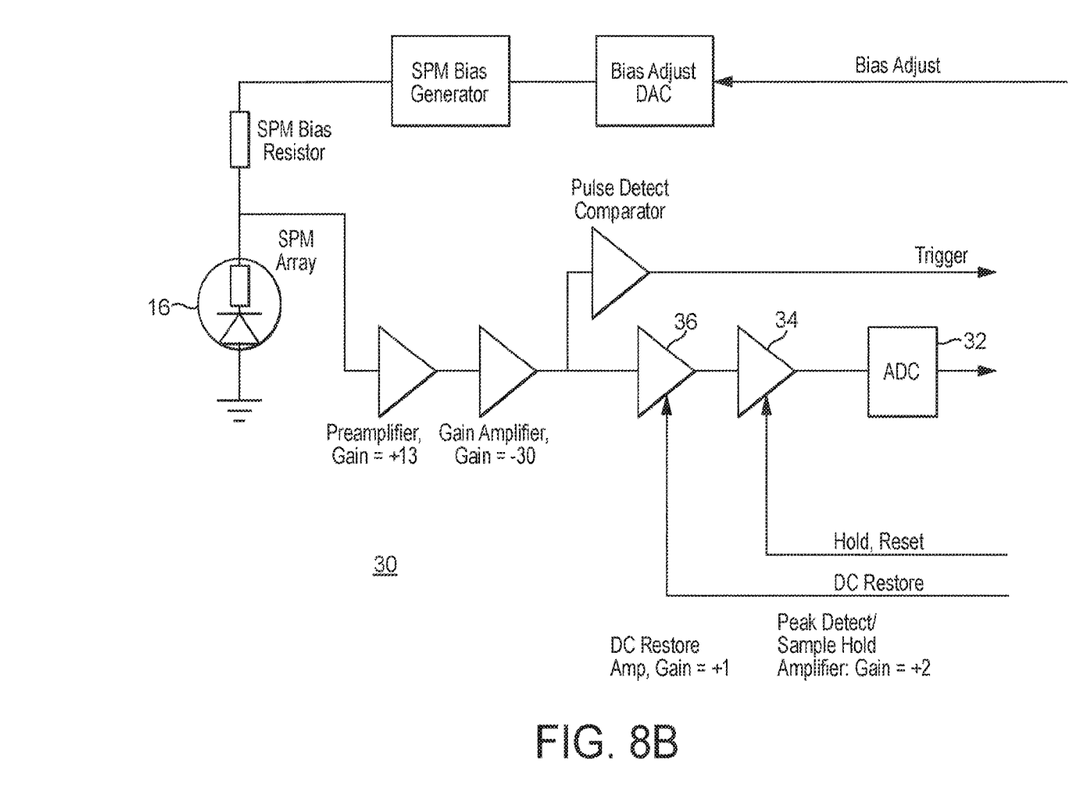

FIG. 8 shows a schematic representation of the detection electronics used for each detector 10. The SPM amplifier circuit 30 receives and amplifies signals from the silicon photomultiplier array 16, and digitises the pulses for output to the FPGA 40 using an ADC 32. The SPM amplifier circuit 30 also includes sample hold/reset 34 and DC restore 36 circuits controlled by the FPGA 40. The FPGA 40 includes: an SPM amplifier timing and control block 42 for control of the SPM amplifier 30 signal gating; a fast (40 MHz) SPI bus 42 for reading the ADC output 34 from the SPM amplifier 30; a pulse height discriminator 46 for pulse height discrimination and outputting count pulse; 256-channel, 32-bit spectrum accumulators 48; 32-bit accumulator 50 for counting total pulse number; 32-bit timestamp counter 52 with 10 μs resolution for time stamping count samples; a microcontroller interface 54; and settings registers 56 for holding various settings required by the FPGA 40 (pulse discriminator thresholds, SPM bias voltage adjustment, timer settings for hold/reset/restore signals, control and status of enable/clear setting for spectrum counters 48, 50). The SPM amplifier timing and control block 42 produces SPM amplifier control signals (hold, reset, DC restore) on receiving a pulse detect trigger from the SPM amplifier and produces a trigger to the SPI circuit to initiate an ADC sample. Counts accumulated by the spectrum counters 48, 50 and timestamp counted by the timestamp counter 52 are copied to sample registers 49, 51, 53 ready for reading by a microcontroller 60, to allow counting to continue while the microcontroller 60 reads the sample. The microcontroller 60 has an address/data bus for writing to and reading registers 49, 51, 53, 54 on the FPGA 40. The microcontroller 60 performs communications with a host over RS485 for setup and reading of counts and spectrum data. The microcontroller 60 reads the FPGA counts and assembles them into a data packet for transmission. An SPI bus 62 transmits signals to the SPM amplifier circuit 30 for adjusting SPM bias and pulse detection threshold based on monitored SPM bias voltage and current signals received from the SPM amplifier circuit 30.

In summary, the present invention provides a thin and compact gamma ray spectrometer for topside and subsea applications with embedded low power electronics for pulse processing and analysis.

It will be appreciated by persons skilled in the art that the above embodiments have been described by way of example only, and not in any limitative sense, and that various alterations and modifications are possible without departure from the scope of the invention as defined by the appended claims.

Aspects of the invention may be as set out in the following numbered clauses:

1. An apparatus for detecting radiation for obtaining density information of a structure, the apparatus comprising:
   at least one detector, the detector comprising:
   a scintillator comprising a scintillating material for emitting light in response to incident radiation, and
   a photodetector for receiving light emitted by the scintillating material and outputting an electrical signal in response to light received from the scintillating material,
   wherein the photodetector comprises at least one silicon photomultiplier.
2. An apparatus according to clause 1, wherein the photodetector comprises a plurality of silicon photomultipliers.
3. An apparatus according to clause 2, wherein the plurality of silicon photomultipliers are tiled along at least one surface of the scintillating material.
4. An apparatus according to clause 2 or clause 3, wherein output signals of said plurality of silicon photomultipliers are combined prior to amplification.
5. An apparatus according to any of clauses 2 to 4, further comprising a power supply arranged to supply power to said plurality of silicon photomultipliers.
6. An apparatus according to any of the preceding clauses, further comprising at least one multichannel analyser for measuring a number of radiation particles from said source detected by at least one said detector, said multichannel analyser comprising a field programmable gate array (FPGA).
7. An apparatus according to clause 6, wherein said or each multichannel analyser is located adjacent to a respective said photodetector.
8. An apparatus according to any of the preceding clauses, further comprising temperature stabilisation means for stabilising the temperature of the or each silicon photomultiplier.
9. An apparatus according to any of the preceding clauses, wherein said radiation is gamma radiation.
10. An apparatus according to any of the preceding clauses, further comprising a source of radiation.
11. An apparatus according to any of the preceding clauses, comprising a plurality of said detectors.
12. An apparatus according to clause 11, further comprising a power supply arranged to supply power to said plurality of said detectors.
13. An apparatus according to clause 11 or clause 12, wherein said plurality of detectors are arranged in an arc around a space adapted to receive a structure to be scanned.
14. An apparatus according to clause 10 and any of clauses 11 to 13, wherein said plurality of detectors and said source are arranged on opposite sides of a space for receiving a structure to be scanned, and the apparatus further comprises means for rotating said plurality of detectors and said source around a structure to be scanned.
15. A method for scanning a structure to detect differences in density between different parts of the structure, comprising:
   providing one or more detectors, said or each detector comprising:
   a scintillator comprising a scintillating material for emitting light in response to incident radiation, and
   a photodetector for receiving light emitted by the scintillating material and outputting an electrical signal in response to light received from the scintillating material,
   wherein the photodetector comprises at least one silicon photomultiplier;
   providing a source of radiation arranged to emit radiation towards said or each detector through the structure to be scanned; and
   measuring a number of radiation particles from said source detected by said or each detector.
16. A method according to clause 15, wherein at least one said photodetector comprises a plurality of silicon photomultipliers.
17. A method according to clause 16, wherein the plurality of silicon photomultipliers are tiled along at least one surface of the respective scintillating material.
18. A method according to any of clause 16 or clause 17, wherein output signals of said plurality of silicon photomultipliers are combined prior to amplification.
19. A method according to any of clauses 16 to 18, further comprising providing a power supply arranged to supply power to said plurality of silicon photomultipliers.
20. A method according to any of clauses 15 to 19, further comprising providing at least one multichannel analyser for measuring a number of radiation particles from said source detected by at least one respective detector, said multichannel analyser comprising a field programmable gate array (FPGA).
21. A method according to clause 20, wherein said or each multichannel analyser is located adjacent to a respective said photodetector.
22. A method according to any of clauses 15 to 21, further comprising stabilising the temperature of the or each silicon photomultiplier.
23. A method according to any of the preceding clauses, wherein said radiation is gamma radiation.
24. A method according to any of clauses 15 to 23, further comprising providing a power supply arranged to supply power to said plurality of said detectors.

25. A method according to any of clauses 15 to 24, wherein a plurality of said detectors are arranged in an arc around a space adapted to receive a structure to be scanned.

26. A method according to any of clauses 15 to 25, wherein a plurality of said detectors and said source are arranged on opposite sides of a space for receiving a structure to be scanned, and said method further comprises rotating said plurality of detectors and said source around a structure to be scanned.

The invention claimed is:

1. A subsea apparatus for scanning a subsea structure to detect changes in density between different parts of the structure, the apparatus comprising:
   a source of radiation; and
   a plurality of detectors arranged in an arc around a space adapted to receive the structure to be scanned, each detector comprising:
      a scintillator comprising a scintillating material for emitting light in response to incident radiation from the source, and
      a photodetector for receiving light emitted by the scintillating material and outputting an electrical signal in response to light received from the scintillating material,
   wherein the photodetector comprises a plurality of silicon photomultipliers and wherein the apparatus is configured such that output signals of said plurality of silicon photomultipliers are combined prior to amplification.

2. The apparatus according to claim 1, wherein the plurality of silicon photomultipliers are tiled along at least one surface of the scintillating material.

3. The apparatus according to claim 1, further comprising a power supply arranged to supply power to said plurality of silicon photomultipliers.

4. The apparatus according to claim 1, further comprising at least one multichannel analyser for measuring a number of radiation particles from said source detected by the plurality of detectors, said multichannel analyser comprising a field programmable gate array (FPGA).

5. The apparatus according to claim 4, wherein said or each multichannel analyser is located adjacent to a respective said photodetector.

6. The apparatus according to claim 1, further comprising a power supply arranged to supply power to said plurality of detectors.

7. The apparatus according to claim 1, wherein the plurality of detectors and said source are arranged on opposite sides of a space for receiving the structure to be scanned, and the apparatus further comprises means for rotating said plurality of detectors and said source around the structure to be scanned.

8. A method for scanning a subsea structure to detect differences in density between different parts of the structure, comprising:
   providing a plurality of detectors arranged in an arc around a space adapted to receive the structure to be scanned, each detector comprising:
      a scintillator comprising a scintillating material for emitting light in response to incident radiation, and
      a photodetector for receiving light emitted by the scintillating material and outputting an electrical signal in response to light received from the scintillating material,
      wherein the photodetector comprises a plurality of silicon photomultipliers;
   providing a source of radiation arranged to emit radiation towards each detector through the structure to be scanned; and
   measuring a number of radiation particles from said source detected by each detector;
      wherein output signals of said plurality of silicon photomultipliers are combined prior to amplification.

9. The method according to claim 8, wherein the plurality of silicon photomultipliers are tiled along at least one surface of the respective scintillating material.

10. The method according to claim 8, further comprising providing a power supply arranged to supply power to said plurality of silicon photomultipliers.

11. The method according to claim 8, further comprising providing at least one multichannel analyser for measuring a number of radiation particles from said source detected by the plurality of detectors, said multichannel analyser comprising a field programmable gate array (FPGA).

12. The method according to claim 11, wherein said or each multichannel analyser is located adjacent to a respective said photodetector.

13. The method according to claim 8, further comprising providing a power supply arranged to supply power to said plurality of detectors.

14. The method according to claim 8, wherein the plurality of detectors and said source are arranged on opposite sides of a space for receiving the structure to be scanned, and said method further comprises rotating said plurality of detectors and said source around the structure to be scanned.

15. The method according to claim 8, wherein the method is carried out at a subsea location at a depth of 1000 m or greater.

16. A subsea apparatus for scanning a subsea structure to detect changes in density between different parts of the structure, the apparatus comprising:
   a source of radiation; and
   a plurality of detectors, each detector comprising:
      a scintillator comprising a scintillating material for emitting light in response to incident radiation from the source, and
      a photodetector for receiving light emitted by the scintillating material and outputting an electrical signal in response to light received from the scintillating material,
      wherein the photodetector comprises a plurality of silicon photomultipliers and wherein the apparatus is configured such that output signals of said plurality of silicon photomultipliers are combined prior to amplification, and
   wherein the plurality of detectors and said source are arranged on opposite sides of a space for receiving a structure to be scanned, and the apparatus further comprises means for rotating said plurality of detectors and said source around the structure to be scanned.

17. The apparatus according to claim 1, wherein the radiation is gamma radiation.

18. The method according to claim 8, wherein the radiation is gamma radiation.

19. The apparatus according to claim 16, wherein the radiation is gamma radiation.

* * * * *